US007692727B2

(12) United States Patent  (10) Patent No.: US 7,692,727 B2
Yoon  (45) Date of Patent: Apr. 6, 2010

(54) CHANNEL SWITCH CONTROL METHOD IN DIGITAL MULTIMEDIA BROADCASTING RECEIVER

(75) Inventor: Jong Hyun Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 1009 days.

(21) Appl. No.: 11/415,119

(22) Filed: May 2, 2006

(65) Prior Publication Data

US 2006/0250527 A1 Nov. 9, 2006

(30) Foreign Application Priority Data

May 3, 2005 (KR) ...................... 10-2005-0037157

(51) Int. Cl.
H04N 5/50 (2006.01)
(52) U.S. Cl. .................. 348/732; 348/731; 348/725; 348/553
(58) Field of Classification Search ......... 348/731–733, 348/553–570, 725; 725/152, 56
See application file for complete search history.

(56) References Cited

U.S. PATENT DOCUMENTS

| | | | | |
|---|---|---|---|---|
| 5,929,944 A * | 7/1999 | Seo | ............................ | 348/731 |
| 5,959,700 A * | 9/1999 | Arikane et al. | .............. | 348/731 |
| 6,710,816 B1 * | 3/2004 | Minami | ...................... | 348/554 |
| 7,113,230 B1 * | 9/2006 | Genovese et al. | ........... | 348/731 |
| 7,380,266 B1 * | 5/2008 | Stayt, Jr. | ...................... | 725/115 |
| 2003/0226153 A1 * | 12/2003 | Bessel et al. | ................. | 725/152 |
| 2004/0003399 A1 * | 1/2004 | Cooper | ......................... | 725/38 |
| 2004/0194134 A1 * | 9/2004 | Gunatilake et al. | ............ | 725/38 |

* cited by examiner

*Primary Examiner*—M. Lee
(74) *Attorney, Agent, or Firm*—Birch, Stewart, Kolasch & Birch, LLP

(57) ABSTRACT

A channel switch control method in a digital multimedia broadcasting receiver is disclosed, wherein discrimination is made as to whether a switch to the erstwhile selected channel has been completed in response to receipt of a channel switch command, and if it is determined that the switch operation to the erstwhile selected channel has not been completed, a switch operation to a newly selected channel in response to the channel switch command is delayed until the switch operation to the erstwhile-selected channel is completed and then the channel switch operation is performed, whereby an unstable operation can be avoided resulting from receipt of a switch command to the new channel before a screen output operation relative to the erstwhile-selected channel is completed.

13 Claims, 2 Drawing Sheets

CHANNEL SWITCH CONTROL METHOD IN DIGITAL MULTIMEDIA BROADCASTING RECEIVER

This application claims the benefit of the Korean Application No. 10-2005-0037157 filed on May 3, 2005, which is hereby incorporated by reference.

BACKGROUND OF THE INVENTION

1. Field of the Invention

The present document relates to a channel switch control method in a digital multimedia broadcasting receiver configured to disable the digital multimedia broadcasting receiver from operating against a channel switch command inputted before a screen output operation finish relative to an erstwhile channel, thereby enabling the digital multimedia broadcasting receiver that consumes a relatively large amount of time for channel switch to operate stably.

2. Description of the Related Art

Typically, a Digital Multimedia Broadcasting (DMB) denotes a new conceptual mobile multimedia broadcasting service combining broadcasting with communication. If mounted with a DMB receiving module, users can be provided with compact disk (CD)-quality sound and various high-level data via a mobile communication terminal, PDA (Personal Digital Assistant) or a vehicle-mounted terminal in transit or at a fixed place.

The DMB service uses as standard Digital Audio Broadcasting (DAB) system standardized from Eureka-147 (European Research Coordination Agency Project-147). The DMB service features multi-channel services and high quality sound, and diversified information can be provided therethrough. The DMB is largely divided into a terrestrial DMB and a satellite DMB according to method and network configurations.

The terrestrial digital broadcasting is largely divided into an American-type digital ATSC (Advanced Television Systems Committee) system using 8-VSB (Vestigial Side Band) modulation method and a DVB-T (Digital Video Broadcasting-Terrestrial) system using OFDM (Orthogonal Frequency Division Multiplexing) modulation method according to transmission method.

The American method is based on NTSC (National Television System Committee) frequency band and is convenient and economically excellent in embodying transmitter and receiver, and a high data transmission rate in a same bandwidth, but is inadequate for DMB that is intended for mobile reception because of weak in multiple interference path.

Accordingly, the terrestrial DMB adopts the European method that has an excellent mobile reception. Although the European method has a disadvantage compared with the American method in that it has a less amount of transmission data than that of the American method in the same bandwidth, but it has an advantage in that it is possible in mobile reception and a strong reception performance that is robust against the multiple interference path. However, a disadvantage is that it is difficult to simultaneously achieve high definition broadcasting and mobile reception at the same time in a frequency band of 6 MHz of each channel under the Korean situation.

The terrestrial DMB service launched in Korea as from Dec. 1, 2005 is embodied in such a manner that a channel is divided into 3 frequency blocks, whereby 3 DMB providers can be selected. Furthermore, it is stipulated that a provider divides for use the allocated frequency block into a TV broadcasting channel, 3 radio broadcasting channels and 1 data broadcasting channel. Consequently, in order to transmit a plurality of mutually different contents within the same frequency band, the same frequency band is so allocated as not to be time-duplicated, and plural contents are multiplexedly transmitted within the allocated time slot.

In a receiver receiving a signal transmitted by time division thus explained, specified contents wanted by a user out of the plural contents received via a frequency band are separated. Furthermore, the separated specified contents are accumulated up to a predetermined amount and receipt state thereof is discriminated. If the receipt state is discriminated as satisfactory, the received signal should be decoded and outputted such that it takes a lot of time to output contents corresponding to the channel selected by the user.

In other words, it is estimated that it takes approximately 2 seconds for a terrestrial DMB receiver to receive and output contents wanted by a user corresponding to a channel switch command. In the consumed time, it is estimated that it takes approximately 1.2 seconds for tuning of a tuner and decoding of a channel decoder to be performed, which is a longer interval than is typically spent by a user swiftly pressing a channel switch key via a remotely controller. In case of a terrestrial DMB receiver, contents corresponding to a channel switched in real time in response to a channel switch command cannot be outputted.

In consideration of characteristics of the terrestrial DMB receiver that cannot respond in real time to the channel switch command, the DMB system may operate unstably if a channel switch command is re-inputted before a screen output operation is completed relative to an erstwhile selected channel.

SUMMARY OF THE INVENTION

Accordingly, it is an object of the present invention to provide a channel switch control method in a digital multimedia broadcasting receiver configured to perform a channel switch operation only to a channel switch command inputted under a state where the channel switch operation is complete relative to an erstwhile selected channel, thereby enabling the digital multimedia broadcasting receiver to operate stably.

In accordance with one object of the present invention, a channel switch control method in a terrestrial digital multimedia broadcasting receiver comprises: discriminating whether switch to an erstwhile-selected channel has been completed in response to receipt of a channel switch command; and delaying a switch operation to a newly selected channel in response to the channel switch command until the switch operation to the erstwhile-selected channel is completed and then performing the channel switch operation if it is determined as a result of the discrimination that the channel switch operation to the erstwhile-selected channel has not been completed.

In accordance with another object of the present invention, a channel switch control method in a terrestrial digital multimedia broadcasting receiver comprises: discriminating whether a channel switch command is effective if the channel switch command is received; discriminating whether a switch operation to an erstwhile-selected channel has been completed if it is discriminated that the channel switch command is effective; and delaying a switch operation to a newly selected channel in response to the channel switch command until the switch operation to the erstwhile-selected channel is completed and then performing the channel switch operation if it is determined as a result of the discrimination that the channel switch operation to the erstwhile-selected channel has not been completed.

BRIEF DESCRIPTION OF THE DRAWINGS

The above and other aspects and advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will be described in detail herein below with reference to the accompanying drawings.

Figure 1:
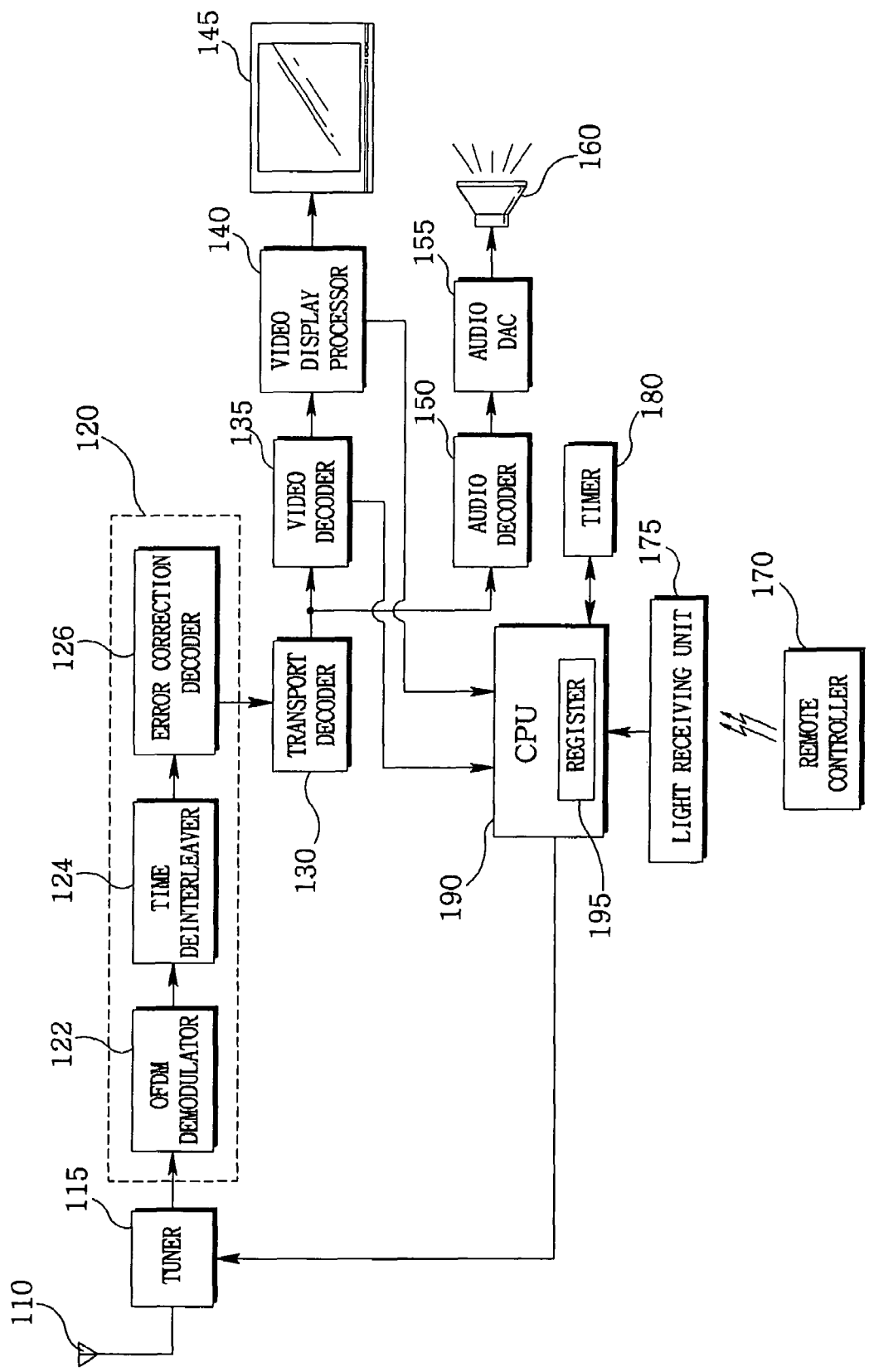
FIG. 1 is a schematic block diagram illustrating a terrestrial DMB receiver according to an embodiment of the present invention.

Referring to FIG. 1, a DMB receiver is comprised of a tuner (115), a channel decoder (120), a transport decoder (130), a video decoder (135), a video display processor (140), an audio decoder (150), an audio Digital/Analog Converter (DAC.155), a light receiving unit (175) and a Central Processing Unit (CPU.190).

The tuner (115) serves to receive a radio frequency via an antenna (110) to select a channel selected by a user, and modulate and output an intermediate frequency signal.

The channel decoder (120) includes an Orthogonal Frequency Division Multiplexing (OFDM) demodulator (122), a time deinterleaver (124) and an error correction decoder (126).

The OFDM demodulator (122) demodulates an OFDM signal contained in the intermediate frequency outputted from the tuner (115) and outputs it.

The time deinterleaver (124) demultiplexes the OFDM signal outputted from the OFDM demodulator (122) and separates it to a plurality of contents, and stores in a buffer memory (not shown) specified contents wanted by a user out of the separated contents. The contents stored in the buffer memory are used for grasping quality of received contents and signal receipt state.

The error correction decoder (126) corrects and outputs errors of specified contents outputted from the time deinterleaver (124).

The transport decoder (130) separates a transport stream outputted from the error correction decoder (126) into a video stream and an audio stream and outputs them to a video decoder (135) and an audio decoder (150) respectively.

The video decoder (135) decodes the video stream outputted from the transport decoder (130) and outputs it to a video display processor (140). The video decoder (135) detects a key frame from the video stream and decodes the video stream based on the detected key frame.

Typically, moving pictures are compressed by the MPEG (Moving Pictures Experts Group) standard. The compression method by the MPEG standard is to select a key frame for every scene and to compress images based on the selected key frame. An image of frame selected as a key frame in the image compression is stored in full-frame image, and frames between the key frames are compared with the key frame and only information about differences between the intervening frames are stored. Consequently, in order to decode video streams compressed by the above-mentioned method, a key frame must be detected.

The video decoder (135) generates an event signal advising to the CPU (190) that a video stream decoding has been completed whenever the video stream decoding is completed for configuration of a screen in response to the erstwhile-selected channel.

The video display processor (140) transforms a video signal outputted from the video decoder (135) to conform to a format of a display screen (145). The video display processor (140) generates an event signal notifying to the CPU (190) that the format transformation has been completed whenever the format transformation is completed and the video signal is outputted to the display screen (145).

The audio decoder (150) decodes the audio stream outputted from the transport decoder (130) and outputs it to the audio DAC (155). The audio DAC (155) converts the audio signal decoded by the audio decoder (150) to an analogue signal and outputs it via a speaker (160). The light receiving unit (175) transmits to the CPU (190) a key code corresponding to an infrared signal received from the remote controller (170).

The CPU (190) controls an overall operation of the terrestrial DMB receiver in response to the key code inputted from the light receiving unit (175). The CPU (190) according to the present invention is mounted with a register (195) for storing information relative to an effective channel selection time required for limiting the channel switch operation.

The information relative to the effective channel selection time stored in the register (195) is renewed if a switch command to a new channel is received under a state where a channel switch operation relative to the erstwhile-selected channel is completed. The effective channel selection time denotes a time that has received a selection command relative to the erstwhile channel.

The CPU (190) according to the present invention discriminates whether a switch operation to the erstwhile-selected channel has been completed if a key code corresponding to the channel switch command is received from the light receiving unit (175), and performs the channel switch operation relative to the newly selected channel only if it is determined that the switch operation is completed relative to the erstwhile-selected channel as a result of the discrimination.

Meanwhile, the CPU (190) delays the channel switch operation relative to the newly selected channel until the channel operation is completed if it is discriminated that the switch operation relative to the erstwhile-selected channel has not been completed as a result of the discrimination, and then performs the channel switch operation.

The switch operation relative to the erstwhile-selected channel according to the embodiment of the present invention denotes that the tuning operation by the tuner (115), the decoding operation by the channel decoder (120), the decoding operation by the video decoder (135), and the format transforming operation by the video display processor (140) are completed, and then an image corresponding to the erstwhile channel is outputted via the display screen (145).

Figure 2:
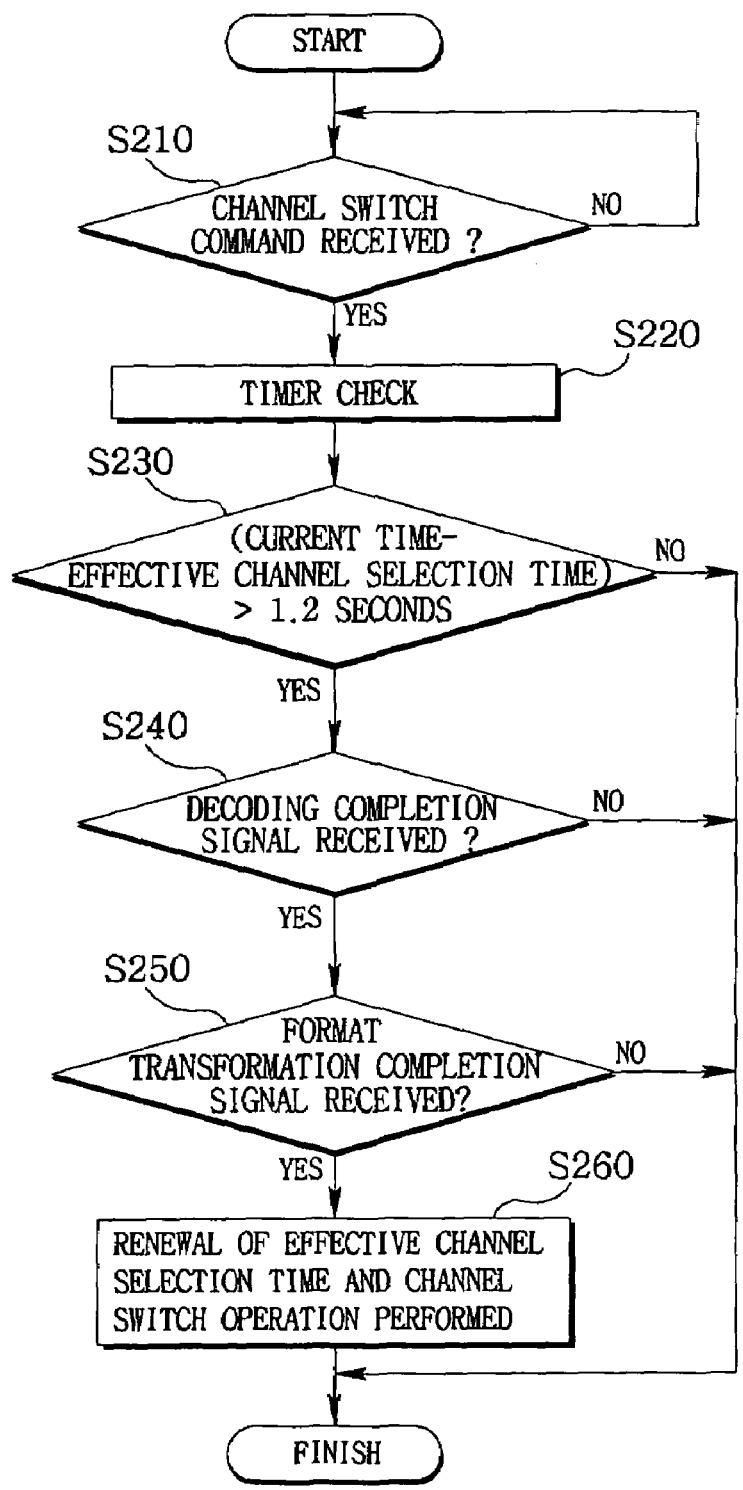
FIG. 2 is a flowchart explaining a channel switch control method according to an embodiment of the present invention.

FIG. 2 is a flowchart explaining a channel switch control method according to an embodiment of the present invention.

Referring to FIGS. 1 and 2, if a key code corresponding to the channel switch command is received from the light receiving unit (175), the CPU (190) uses a timer (180) to check a current time (S220). A user manipulates a channel UP/DOWN key provided on the remote controller (170) or a number key to enable to input a channel switch command.

The CPU (190) uses the timer (180) to discriminate whether a time having subtracted the effective channel selection time stored in the register (195) from the checked time has surpassed a reference time (S230). The reference time of approximately 1.2 seconds is a time established based on a time consumed for the channel decoder (120) to decode the signal inputted from the tuner (115).

If it is determined as a result of the discrimination at S230 that the time having subtracted the effective channel selection time stored in the register (195) from the checked time has surpassed a reference time, the CPU (190) discriminates whether an event signal has been received from the video decoder (135), notifying that the video stream decoding for configuration of a screen relative to the erstwhile-selected channel has been completed (S240).

Meanwhile, if it is determined as a result of the discrimination at S230 that the time having subtracted the effective channel selection time stored in the register (195) from the checked time has not surpassed the reference time, the CPU (190) determines that the currently-inputted channel switch command is an erroneous input and does not perform a switch operation to the newly selected channel.

As a result of discrimination at S240, if it is determined that an event signal has been received from the video decoder (135), notifying that the video stream decoding has been completed, the CPU (190) discriminates whether an event signal has been received from the video display processor (140), notifying that a format transformation has been completed (S250).

If it is discriminated at S250 that the event signal has been received from the video display processor (140), notifying that a format transformation has been completed, the CPU (190) renews the effective channel selection time stored in the register (195) to the time checked at S220 and at the same time, performs a channel switch operation to the newly selected channel (S260). For example, the CPU (190) controls the tuner (115) in such a manner that a channel corresponding to the key code received at 210 can be selected.

As mentioned earlier, even if a channel switch command is received from a user, the channel switch command is discriminated as an effective channel switch command only if the conditions of S230 to S250 are all satisfied, and then a switch operation is performed relative to the newly selected channel such that a time necessary for executing a basic operation relative to the erstwhile-selected channel can be obtained.

As apparent from the foregoing, there is an advantage in the channel switch control method in a terrestrial digital multimedia broadcasting receiver thus described according to the present invention in that a new channel can be selected only if it is discriminated that a screen output operation relative to the erstwhile-selected channel has been completed, such that an unstable operation can be avoided resulting from receipt of a switch command to the new channel before a screen output operation relative to the erstwhile-selected channel is completed.

Although the invention has been described with reference to a specific embodiment, this description is not meant to be construed in a limiting sense. Various modifications of the disclosed embodiment, as well as other embodiments of the present invention, will become apparent to persons skilled in the art upon reference to the description of the invention. It is therefore contemplated that the appended claims will cover any such modifications or embodiments as fall within the true scope of the invention.

What is claimed is:

1. A channel switch control method in a digital multimedia broadcasting receiver comprising:
   discriminating whether switch to an erstwhile-selected channel has been completed in response to receipt of a channel switch command; and delaying a switch operation to a newly-selected channel in response to the channel switch command until the switch operation to the erstwhile-selected channel is completed and then performing the channel switch operation if it is determined as a result of the discrimination that the channel switch operation to the erstwhile-selected channel has not been completed.

2. The method as defined in claim 1, further comprising performing a switch operation to the newly-selected channel if it is determined as a result of the discrimination that the switch operation to the erstwhile-selected channel has been completed.

3. The method as defined in claim 1, wherein the discrimination of whether the switch operation to the erstwhile-selected channel has been completed is determined by checking whether a signal processing operation for displaying an image corresponding to the erstwhile-selected channel has been completed.

4. A channel switch control method in a digital multimedia broadcasting receiver comprising:
   discriminating whether a channel switch command is effective if the channel switch command is received;
   discriminating whether a switch operation to an erstwhile-selected channel has been completed if it is discriminated that the channel switch command is effective; and
   delaying a switch operation to a newly selected channel in response to the channel switch command until the switch operation to the erstwhile-selected channel is completed and then performing the channel switch operation if it is determined as a result of the discrimination that the channel switch operation to the erstwhile-selected channel has not been completed.

5. The method as defined in claim 4, further comprising performing a switch operation to the newly-selected channel if it is determined as a result of the discrimination that the channel switch operation to the erstwhile-selected channel has been completed.

6. The method as defined in claim 4, wherein discrimination of whether the channel switch command is effective is determined by comparing a time obtained by subtracting an effective channel selection time stored in a register from a time having received the channel switch command with a pre-set reference time.

7. The method as defined in claim 6, wherein the channel switch command is discriminated as effective if it is determined as a result of the discrimination that the time having subtracted the effective channel selection time stored in the register from the time having received the channel switch command has surpassed the reference time.

8. The method as defined in claim 6, further comprising disregarding the channel switch command and continuously performing a tuning operation relative to the erstwhile channel if it is determined as a result of the discrimination that the time having subtracted the effective channel selection time stored in the register from the time having received the channel switch command has not surpassed the reference time.

9. The method as defined in claim 4, wherein determination of whether the switch operation to the erstwhile-selected channel has been completed is discriminated by checking whether a signal processing operation for displaying an image corresponding to the erstwhile-selected channel has been completed.

10. The method as defined in claim 6, wherein the effective channel selection time is a time having received a selection command relative to the erstwhile channel.

11. The method as defined in claim 6, wherein the effective channel selection time is renewed to a time having received the channel switch command if it is discriminated that the switch operation to the erstwhile selected channel has been completed.

12. The method as defined in claim 6, wherein the reference time is a time established based on a time consumed for decoding an image corresponding to the erstwhile selected channel.

13. The method as defined in claim 6, wherein the reference time is in a range of 1.0~1.5 seconds.

* * * * *